UNITED STATES PATENT OFFICE.

JOHN C. SCHUMAN, OF AKRON, ASSIGNOR TO WILLIAM T. JEBB, OF BUFFALO, NEW YORK.

METHOD OF PREPARING AND TREATING STARCH.

SPECIFICATION forming part of Letters Patent No. 320,401, dated June 16, 1885.

Application filed May 18, 1885. (No specimens.)

*To all whom it may concern:*

Be it known that I, JOHN C. SCHUMAN, of Akron, in the county of Erie and State of New York, have invented a new and useful Improvement in the Method of Preparing and Treating Starch, of which the following is a specification.

This invention relates to an improvement in the ordinary method of treating Indian corn or maize for extracting the starch therefrom and for producing distilled spirits from such starch.

The object of this invention is to extract the starch from the corn in a simple, expeditious, and inexpensive manner, substantially free from impurities and in a condition in which it can be readily mashed, fermented, and distilled, producing distilled spirits which are correspondingly free from impurities, while the hulls, germs, and other offal are separated from the starch in a condition in which they can be advantageously utilized either for producing a separate grade of distilled spirits or for cattle-feed.

In practicing my invention the corn is first steeped in a suitable vat or tank, which is provided with a perforated false bottom for draining, at a temperature of about 140° Fahrenheit, for about fifteen hours, and this temperature is maintained in the steep-tank by renewing the water from time to time from a tank containing hot water. The temperature is preferably not allowed to rise to 155° Fahrenheit, as it would cause the starch cells to burst and render the subsequent recovery of the starch difficult, if not impossible. When the steeping is completed, the kernels of corn have become expanded, swelled, and softened by the combined action of the heat and moisture, and the hulls and germs tend to separate from the starchy portions of the kernels, so that these component parts of the kernels are only loosely held together and in a condition in which they can be partially detached from each other by the following process: The warm water is now drawn from the steep, and cold water is introduced into the same, whereby the corn is cooled or chilled. This not only presents the corn to the subsequent operation of reduction in a cold state, but also tends to toughen the hulls and germs, and renders them less liable to become finely pulverized in reducing the kernels. The water is next drained thoroughly from the corn in the steep-vat, a period of from four to six hours being usually allowed for this purpose. The steeped corn, after having been thoroughly drained, is next reduced in a suitable mill, which is preferably a disk-mill in which one disk has a slight eccentric movement with reference to the other, and which is known as the "Bogardus mill;" or, if preferred, a roller-mill or other reduction-machine whereby the corn is coarsely ground or crushed may be employed for this purpose. By this machine the corn is coarsely ground or reduced, whereby the hulls and germs are to a large extent detached from the starchy portions of the kernels in comparatively large fragments, while the starchy portions are more finely reduced, so that a large proportion of the starch can be separated from the fragments of hulls and broken germs. This is accomplished by a suitable vibrating or rolling screen, which is so clothed that the starch passes through the meshes of the screen while the hulls and broken germs tail off together; or, if desired, the reduced material may be divided by the screen into a number of different products of different degrees of fineness, the finest product being crude starch, while the coarser products consist of fragments of hulls and broken germs containing a greater or less admixture of starch. The crude starch or starch-meal may now be mashed, fermented, and distilled; but before further treating the starch it is preferably subjected to a second reducing operation, whereby it is reduced to a greater degree of fineness. The tailings or coarse products may also be reduced again for the purpose of detaching the starch which may adhere to the fragments of hulls and germs, and this detached starch is recovered by a second sifting operation. The crude starch so obtained may now be mashed in the ordinary manner in an open mash-tub under the pressure of the atmosphere; but it is preferably first developed in a closed tank under a steam-pressure of about forty pounds to the square inch, at which pressure the starch is boiled with water for several hours until it has been fully developed. This developing-tank is provided with a suitable stirer or agitator and a safety-valve and pressure-gage for regulating the pressure.

The developed starch liquid is then mashed by the addition of rye at a temperature of about 150° Fahrenheit, and by the subsequent addition of malt at a temperature of about 142° Fahrenheit. The mash is next fermented by the addition of yeast and the fermented beer is distilled in a still of any ordinary or suitable construction. The starch meal which is so developed, and afterward mashed and fermented, is substantially free from coarse impurities. The operations of developing, mashing, fermenting, and distilling are therefore carried on more uniformly and effectively, the temperature during fermentation can be more closely regulated, whereby a larger yield is obtained, and the distillation can be effected with le s violence and less heat, whereby less impurities are carried over with the alcohol.

The offal may be developed, mashed, fermented, and distilled in like manner, whereby a grade of spirits of less purity is produced, which, although inferior to the first grade, is useful and tends to reduce the cost of the first grade; or the offal may be utilized as cattle-feed, either in the moist condition or after drying, which can be effected at small expense.

I claim as my invention—

1. The herein-described method of extracting the starch from the corn and preparing the mash, which consists in steeping the corn, then draining the corn, then coarsely grinding or crushing the corn, then separating the crude starch from the coarse offal by sifting, and then mashing the separated starch, substantially as set forth.

2. The herein-described method of extracting the starch from the corn and preparing the mash, which consists in steeping the corn, then draining the corn, then coarsely grinding or crushing the corn, then separating the crude starch from the coarse offal by sifting, then developing the separated starch under pressure, and then mashing the developed starch, substantially as set forth.

3. The herein-described method of manufacturing distilled spirits from Indian corn, which consists in steeping the corn, then draining the corn, then coarsely grinding or crushing the corn, then separating the crude starch from the coarse offal by sifting, and then mashing, fermenting, and distilling the starch and the coarse offal separately, substantially as set forth.

Witness my hand this 15th day of May, 1885.

JOHN C. SCHUMAN.

Witnesses:
WM. H. CARR,
W. ELMORE.